(12) United States Patent
Du (10) Patent No.: US 11,661,157 B2
(45) Date of Patent: May 30, 2023

(54) OFFSHORE FLOATING ISLAND

(71) Applicant: Di Du, Liaoning (CN)

(72) Inventor: Di Du, Liaoning (CN)

( * ) Notice: Subject to any disclaimer, the term of this patent is extended or adjusted under 35 U.S.C. 154(b) by 33 days.

(21) Appl. No.: 17/374,582

(22) Filed: Jul. 13, 2021

(65) Prior Publication Data
US 2022/0340242 A1 Oct. 27, 2022

(30) Foreign Application Priority Data

Apr. 22, 2021 (CN) .......................... 202110434407.5

(51) Int. Cl.
| | |
|---|---|
| *B63B 77/00* | (2020.01) |
| *B63B 39/06* | (2006.01) |
| *B63B 35/44* | (2006.01) |
| *B63B 73/40* | (2020.01) |
| *B63B 39/00* | (2006.01) |
| *B63G 8/41* | (2006.01) |
| *E02B 17/00* | (2006.01) |
| *E02D 5/76* | (2006.01) |

(52) U.S. Cl.
CPC .............. *B63B 35/44* (2013.01); *B63B 39/00* (2013.01); *B63B 73/40* (2020.01); *B63G 8/41* (2013.01); *E02B 17/003* (2013.01); *E02D 5/76* (2013.01); *E02B 2017/0056* (2013.01)

(58) Field of Classification Search
CPC ......... B63B 35/44; B63B 39/00; B63B 73/40; B63B 35/4406; B63B 77/00; B63B 39/06; B63B 2035/442; B63B 75/00; B63G 8/41; E02B 17/003; E02B 2017/0056; E02B 17/027; E02B 17/021; E02B 2017/0052; E02B 2017/0043; E02B 2017/0082; E02B 2017/0086; E02D 5/76
See application file for complete search history.

(56) References Cited

U.S. PATENT DOCUMENTS

| | | | | |
|---|---|---|---|---|
| 984,133 | A * | 2/1911 | Giese ........................ | B63C 1/02 114/45 |
| 2,551,375 | A * | 5/1951 | Hayward ............... | E02B 17/027 405/207 |
| 2,579,703 | A * | 12/1951 | Rutledge ................ | E02B 17/027 405/207 |
| 2,658,353 | A * | 11/1953 | Trexel ................... | E02B 17/021 405/209 |
| 2,921,442 | A * | 1/1960 | Laborde ................ | E02B 17/027 405/207 |

(Continued)

*Primary Examiner* — Edwin J Toledo-Duran (57) ABSTRACT

An offshore floating island includes a supporting structure and an island main body. The bottom of the supporting structure is fixed at the seabed, and the island main body includes one or two or more compartment bodies; the upper part of the supporting structure is provided with a carrying part; the bottom of each compartment body is provided with a mounting part; the compartment body is of a cavity structure, and a filler is injected to the compartment body till the compartment body sinks to cause the mounting part to be in lock type clamping with the carrying part. The island main body is of a compartment-sinking type structure; the filler is poured into the compartment bodies to cause the compartment bodies to sink; the mounting parts and the carrying part cooperate to realize detachable connection between the supporting structure and the compartment bodies.

8 Claims, 7 Drawing Sheets

(56) References Cited

U.S. PATENT DOCUMENTS

| | | | | |
|---|---|---|---|---|
| 3,128,604 A | * | 4/1964 | Sandberg | E02B 17/027 405/207 |
| 3,766,583 A | * | 10/1973 | Phelps | F25J 1/0288 405/203 |
| 3,831,385 A | * | 8/1974 | Hudson | E02B 17/0021 165/45 |
| 3,855,809 A | * | 12/1974 | Westling | B65D 88/78 114/257 |
| 3,879,952 A | * | 4/1975 | Mo | E02B 17/025 405/207 |
| 3,906,735 A | * | 9/1975 | Mo | E02D 23/02 405/207 |
| 3,911,687 A | * | 10/1975 | Mo | E02D 27/52 405/225 |
| 4,087,984 A | * | 5/1978 | Mo | E02B 17/025 405/207 |
| 4,188,157 A | * | 2/1980 | Vigander | F17C 3/005 405/207 |
| 4,265,568 A | * | 5/1981 | Herrmann | E02B 17/021 405/196 |
| 4,422,804 A | * | 12/1983 | Gerwick, Jr. | E02B 17/025 405/211 |
| 4,470,725 A | * | 9/1984 | Kure | E02B 17/0021 405/212 |
| 4,484,841 A | * | 11/1984 | Einstabland | E02B 17/0021 405/195.1 |
| 4,511,288 A | * | 4/1985 | Wetmore | E02B 17/0008 405/203 |
| 5,125,769 A | * | 6/1992 | Lee | E02B 17/00 405/226 |
| 5,292,207 A | * | 3/1994 | Scott | E02B 17/0021 405/207 |
| 5,609,442 A | * | 3/1997 | Horton | B63B 35/4413 405/196 |
| 5,741,089 A | * | 4/1998 | Gallaher | E02B 17/027 405/196 |
| 6,761,124 B1 | * | 7/2004 | Srinivasan | B63B 1/107 405/195.1 |
| 9,856,621 B2 | * | 1/2018 | Johnson, Jr. | E02D 27/525 |
| 10,443,574 B2 | * | 10/2019 | Remón | E02B 17/024 |
| 2004/0045490 A1 | * | 3/2004 | Goldbach | B65D 88/78 114/257 |
| 2004/0253060 A1 | * | 12/2004 | Horton, III | B63B 77/00 405/203 |
| 2005/0084336 A1 | * | 4/2005 | Xu | E02B 17/021 405/200 |
| 2005/0191136 A1 | * | 9/2005 | Xu | B63B 77/00 405/203 |
| 2008/0014024 A1 | * | 1/2008 | Lokken | B63B 35/4406 405/195.1 |
| 2009/0148241 A1 | * | 6/2009 | Ouwehand | E02B 17/00 114/263 |
| 2010/0150660 A1 | * | 6/2010 | Nadarajah | E02B 17/025 405/196 |
| 2011/0158750 A1 | * | 6/2011 | Reichel | E02B 17/02 405/205 |
| 2013/0011199 A1 | * | 1/2013 | Kibbee | F03G 7/05 405/169 |
| 2013/0292128 A1 | * | 11/2013 | Brinkmann | E21B 43/013 166/344 |

* cited by examiner

OFFSHORE FLOATING ISLAND

CROSS REFERENCE TO RELATED APPLICATION

This application takes priority from and claims the benefit of Chinese Patent Application No. 202110434407.5 filed on Apr. 22, 2021, the contents of which are herein incorporated by reference.

TECHNICAL FIELD

The present disclosure relates to the technical field of offshore structures, in particular, an offshore floating island.

BACKGROUND

Rich marine resources occupy a large space. With the sustainable development of the economy, a need to build a base island on the sea has also arisen at the historic moment. Development and construction of offshore, submarine and undersea foundations is a future development trend.

The applicant found that the existing technology has at least the following technical problems:

In the existing technology, floating islands are usually built by sea reclamation, and artificial islands and reefs are built by the above-mentioned measures. However, the sea reclamation has also caused great damage to the coastal ecology and destroyed the marine system. How to sustainably develop the marine resources is the direction of future development.

SUMMARY

The present disclosure is directed to provide an offshore floating island to solve the technical problems in the existing technology that construction of an offshore floating island needs sea reclamation, which destroys the marine ecology, and is hard to move once it is built. Many technical effects that can be achieved by preferred technical solutions in many technical solutions provided by the present invention are described in detail below.

In order to achieve the forgoing purpose, the present disclosure provides the following technical solution.

The offshore floating island provided by the present invention includes a supporting structure and an island main body.

The bottom of the supporting structure is fixed at the seabed, and the island main body includes one or two or more compartment bodies;

the upper part of the supporting structure is provided with a carrying part; the bottom of each compartment body is provided with a mounting part; the compartment body is of a cavity structure, and a filler is injected to the compartment body till the compartment body sinks to cause the mounting part to be in lock type clamping with the carrying part, so that the compartment body and the supporting structure are detachably connected; and each compartment body is at least partially higher than the sea surface after the compartment body and the supporting structure are assembled in place.

Preferably, one of the carrying part and the mounting part is a protruding structure, and the other one is a clamping slot structure; the protruding structure and the clamping slot structure adapt to each other and are in lock type clamping; the filler is liquid; each compartment body is provided with a liquid injection port; and the bottom of each compartment body has a balance weight layer to facilitate sinking of the compartment body.

Preferably, the offshore floating island further includes a fender wall; the fender wall is vertically disposed, with the bottom end fixed at the seabed through a fixing anchor rod; a longitudinal section of the fender wall is of a cross structure, wherein a part in the cross structure above a horizontal section is located on the sea surface; and the horizontal section and a vertical section are connected through an arc-shaped buffer plane.

Preferably, two or more layers of fender walls are provided, and all the fender walls surround the island main body; each layer of fender wall has an open part to allow a ship to get in and get out, and all the open parts are disposed on different sides of the island main body; and adjacent fender walls are disposed at intervals to form a travel passage.

Preferably, the supporting structure includes a pier; the pier includes a mast main body and a base; the carrying part is located at the upper part of the mast main body, wherein the base is connected to the bottom end of the mast main body and buried into the seabed; the mast main body includes a plurality of sections of upright columns connected in sequence through connection piles; the base is provided with pull rods; and the pull rods are distributed on two sides of the mast main body and are connected with the mast main body and the base.

Preferably, two or more piers are provided; a fixed assembly for connecting adjacent piers exists between the adjacent piers; each fixed assembly includes rod bodies and connection pieces, wherein the rod bodies are horizontally disposed and/or vertically disposed and/or staggered; and the connection pieces are provided with a plurality of sleeve bodies for inserting and fixing the rod bodies to connect the plurality of adjacent rod bodies.

Preferably, the supporting structure includes an anchor rod and a hydraulic mechanism, wherein the upper ends of the anchor rod and the hydraulic mechanism are both connected with the compartment bodies, and the lower ends of the anchor rod and the hydraulic mechanism are both fixed at the seabed;

the hydraulic mechanism includes a shell and a hydraulic telescopic rod; the hydraulic telescopic rod is located in the shell, and a telescopic end of the hydraulic telescopic rod abuts against the bottoms of the compartment bodies to push the compartment bodies; the anchor rod is used to pull down the compartment bodies; and the anchor rod is provided with a buffer piece that telescopically deforms under the action of an external force;

the supporting structure further includes a protective housing; the protective housing covers the anchor rod and the hydraulic mechanism inside; the protective housing is a hood body of a corrugated structure and can telescopically deform under the action of the external force.

Preferably, a submarine foundation is also arranged below the island main body; the submarine foundation includes an outer shell and a ventilation pipeline; an independent foundation space is constructed in the outer shell; the ventilation pipeline is located in the supporting structure; the bottom end of the ventilation pipeline communicates with the foundation space, and the upper end of the ventilation pipeline extends to a position above the sea surface;

a seabed fender wall exists at a periphery of the submarine foundation; the seabed fender wall is fixed at the seabed, and has a vertical height not less than that of the submarine foundation; and at least one side surface of the seabed fender wall facing away from the submarine foundation is an arc-shaped surface to buffer impact of seawater.

Preferably, an elevator access exists in the supporting structure, and the elevator access is connected with the island main body and the submarine foundation.

The offshore floating island further includes an escape system. The escape system includes a safety cabin and an escape cabin; the safety cabin is arranged on the supporting structure, and an emergency escape exit is arranged on the safety cabin; the escape cabin is located in the safety cabin; and the escape cabin is equipped with a propeller propulsion mechanism.

Preferably, the island main body is also connected with edge islands, wherein all the edge islands are distributed around the island main body, and are connected to the island main body through bridges; the structure of each edge island is the same as the island main body;

the offshore floating island is also connected with a submarine tunnel and/or an offshore tunnel.

Compared with the existing technology, the offshore floating island provided by the present disclosure has the following beneficial effects: the island main body is fixed on the sea surface through the supporting structure, and the island main body is of a compartment-sinking type structure; the bottom of each compartment body is provided with the mounting part; and the upper part of the supporting structure is provided with the carrying part. During assembling, liquid is poured into the compartment body till the compartment body sinks. When the gravity of the compartment body is greater than a floatage on it, the compartment body can sink till the mounting part and the carrying part are in lock type clamping to realize detachable connection between the compartment body and the supporting structure, so that the connection structure is stable, and sea reclamation is not required. Furthermore, when the island main body needs to move, the liquid in each compartment body is pumped out, and the balance weight is hoisted out of the compartment body. Buildings on the island main body are detachable, so that the whole island main body rises up and is transported by a large-size tugboat, push boat and other booster ships to a predetermined location and then reassembled; movement of the island main body can be realized according to a specific plane; and the arrangement is more flexible.

BRIEF DESCRIPTION OF THE DRAWINGS

To describe the embodiments of the present disclosure or the technical solutions in the existing art more clearly, drawings required to be used in the embodiments or the illustration of the existing art will be briefly introduced below. Obviously, the drawings in the illustration below are only some embodiments of the present disclosure. Those ordinarily skilled in the art also can acquire other drawings according to the provided drawings without doing creative work.

In the drawings: 100: sea surface; 200: ship; 300: tunnel; 1: island main body; 11: first compartment body; 12: second compartment body; 101: decorative layer; 110: liquid injection port; 111: mounting part; 112: balance weight layer; 2: supporting structure; 21: mast main body; 211: upright column; 212: connection pile; 22: base; 221: pull rod; 23: hydraulic mechanism; 231: shell; 232: hydraulic telescopic rod; 24: anchor rod; 241: buffer piece; 242: fixed seat; 25: protective housing; 3: fender wall; 301: open part; 31: arc-shaped buffer plane; 32: fixing anchor rod; 33: anchor stake; 4: carrying part; 5: fixed assembly; 51: rod body; 52: connection piece; 521: sleeve body; 6: submarine foundation; 61: outer shell; 62: ventilation pipeline; 7: seabed fender wall; 71: arc-shaped surface; 8: escape system; 81: escape cabin; 82: safety cabin; 9: edge island; 91: bridge.

DESCRIPTION OF THE EMBODIMENTS

In order to make the purposes, technical solutions and advantages of the present disclosure clearer, the technical solutions of the present disclosure will be described in detail below. It is apparent that the described embodiments are a part of the embodiments of the present disclosure, not all the embodiments. Based on the embodiments in the present disclosure, all other embodiments obtained by those of ordinary skill in the art without creative efforts shall fall within the protection scope of the present disclosure.

In the description of the present disclosure, it should be understood that orientations or positional relationships indicated by the terms "center", "length", "width", "height", "upper", "lower", "front", "rear", "left", "right", "vertical", "horizontal", "top", "bottom", "inside", "outside", "lateral", and the like are orientations or positional relationships as shown in the drawings, and are only for the purpose of facilitating and simplifying the description of the present invention instead of indicating or implying that devices or elements indicated must have particular orientations, and be constructed and operated in the particular orientations, so that these terms are not construed as limiting the present invention. In the description of the present disclosure, unless otherwise indicated, "plurality" means two or more.

The method for building an offshore floating island by sea reclamation in the existing technology destroys the marine ecological environment and is not beneficial to sustainable development. Therefore, researchers want to build an offshore foundation in other ways. However, when constructing offshore foundations without reclaiming lands from the sea, the offshore bases are often poor in stability and are vulnerable to harsh environments such as waves and sea breeze. Once the construction of an offshore foundation is completed, the offshore foundation is difficult to move.

The embodiment of the present disclosure provides an offshore floating island that is built without sea reclamation, has good stability, is convenient to assemble, disassemble and move.

The technical solution provided by the present disclosure is described in more details below in combination with FIG. 1 to FIG. 6.

Embodiment 1

As shown in FIG. 1 to FIG. 6, the present embodiment provides an offshore floating island. The offshore floating island includes a supporting structure 2 and an island main body 1. The bottom of the supporting structure 2 is fixed at the seabed, and the island main body 1 includes one or two or more compartment bodies; the upper part of the supporting structure 2 is provided with a carrying part 4; the bottom of each compartment body is provided with a mounting part 111; the compartment body is of a cavity structure, and a filler is injected to the compartment body till the compartment body sinks to cause the mounting part 111 to be in lock type clamping with the carrying part 4, so that the compartment body and the supporting structure 2 are detachably connected; and each compartment body is at least partially higher than the sea surface 100 after the compartment body and the supporting structure 2 are assembled in place.

The island main body 1 is composed of the compartment bodies; there is a decorative layer 101 at a periphery of each compartment body; the decorative layer 101 can be set to be a shell structure; and the compartment body is hoisted into the shell structure. When the filler is poured into the compartment body till the compartment body sinks to cause the mounting part 111 to be clamped with the carrying part 4 on the supporting part 2, the compartment body can be clamped and fixed on the supporting structure 2. The filler can be liquid, such as water, saline water and other pollution-free liquid. A steel bar structure and a detachable building, such as an ecological agricultural planting foundation, an environmentally-friendly breeding foundation and a business place can be set on the upper surface of the compartment body, that is convenient to disassemble, assemble, move and repair. In term of energy, the building can be equipped with seawater power generation equipment, wind power generation equipment, small-size nuclear electric power generation equipment, solar energy power generation equipment, etc., and uses sea resources to generate regenerable environmentally-friendly energy; and a sewage treatment plant, a garbage disposal plant and other places are set for centralized treatment of sewage and garbage on the island main body to prevent environmental pollution. In term of water resources, rainwater collection and purification and seawater desalting systems can be set on the island main body to solve the problem of domestic water. In terms of traffic, a cargo and passenger dock, a port, an airport, a heliport, connections for marine and submarine traffic tunnel trains, etc. can be constructed to solve the problem of access to the island main body.

In the offshore floating island of the present embodiment, on the one hand, the island main body 1 is fixed on the sea surface 100 through the supporting structure 2, and the island main body 1 is of a compartment-sinking type structure; the bottom of each compartment body is provided with the mounting part 111; and the upper part of the supporting structure 2 is provided with the carrying part 4. During assembling, liquid is poured into the compartment body till the compartment body sinks. When the gravity of the compartment body is greater than a floatage on it, the compartment body can sink till the mounting part 111 and the carrying part 4 are in lock type clamping to realize detachable connection between the compartment body and the supporting structure 2, so that the connection structure is stable, and sea reclamation is not required.

On the other hand, when the island main body 1 needs to move, the liquid in each compartment body is pumped out, and the balance weight is hoisted out of the compartment body; buildings on the island main body 1 are detachable, so that the whole island main body 1 rises up and is transported by a large-size tugboat, push boat and other booster ships to a predetermined location and then reassembled; movement of the island main body 1 can be realized according to a specific plane: and the arrangement is more flexible.

Figure 1:
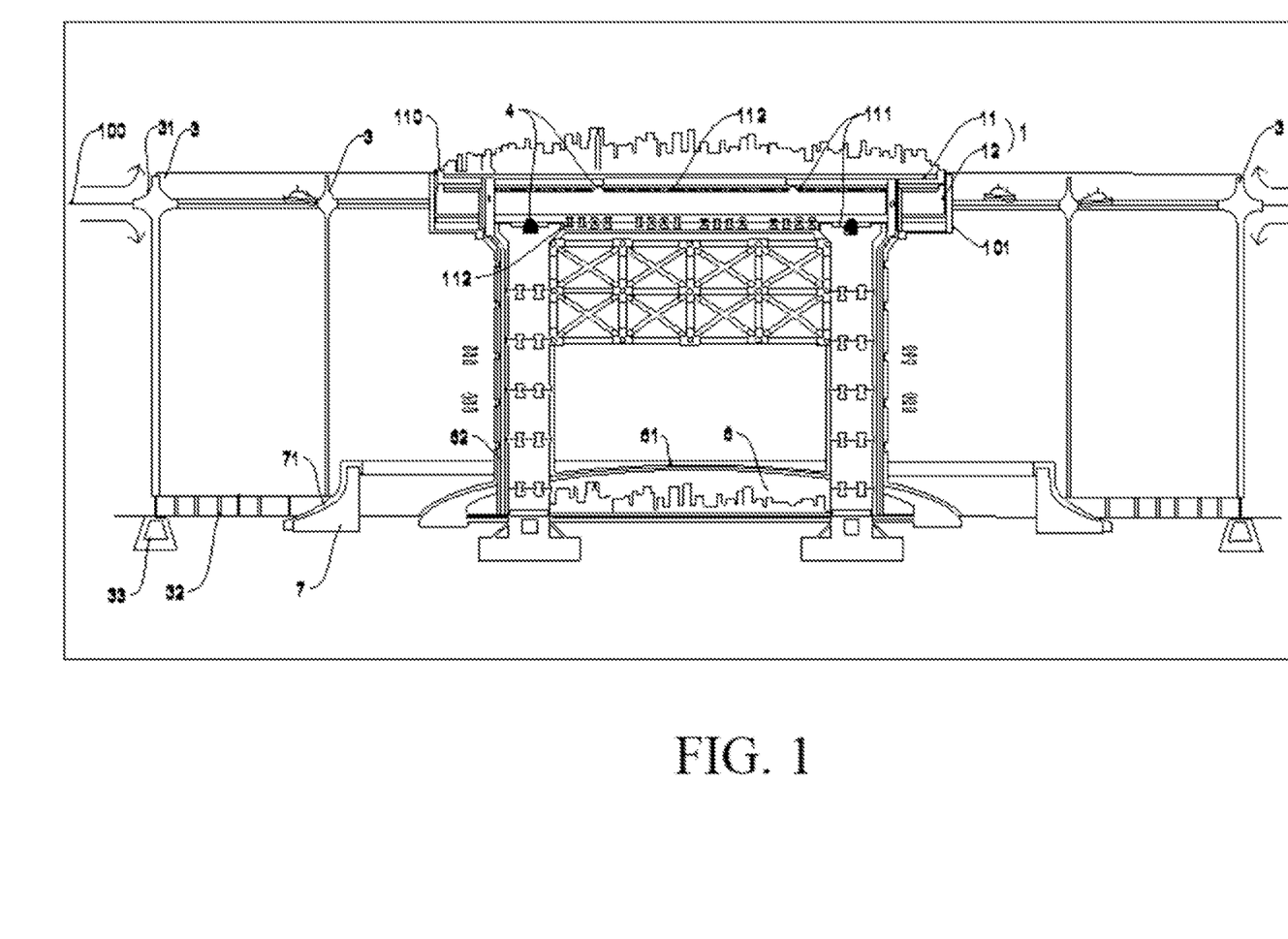
FIG. 1 is an overall schematic structural diagram of a first embodiment of an offshore floating island of the present disclosure.
Figure 2:
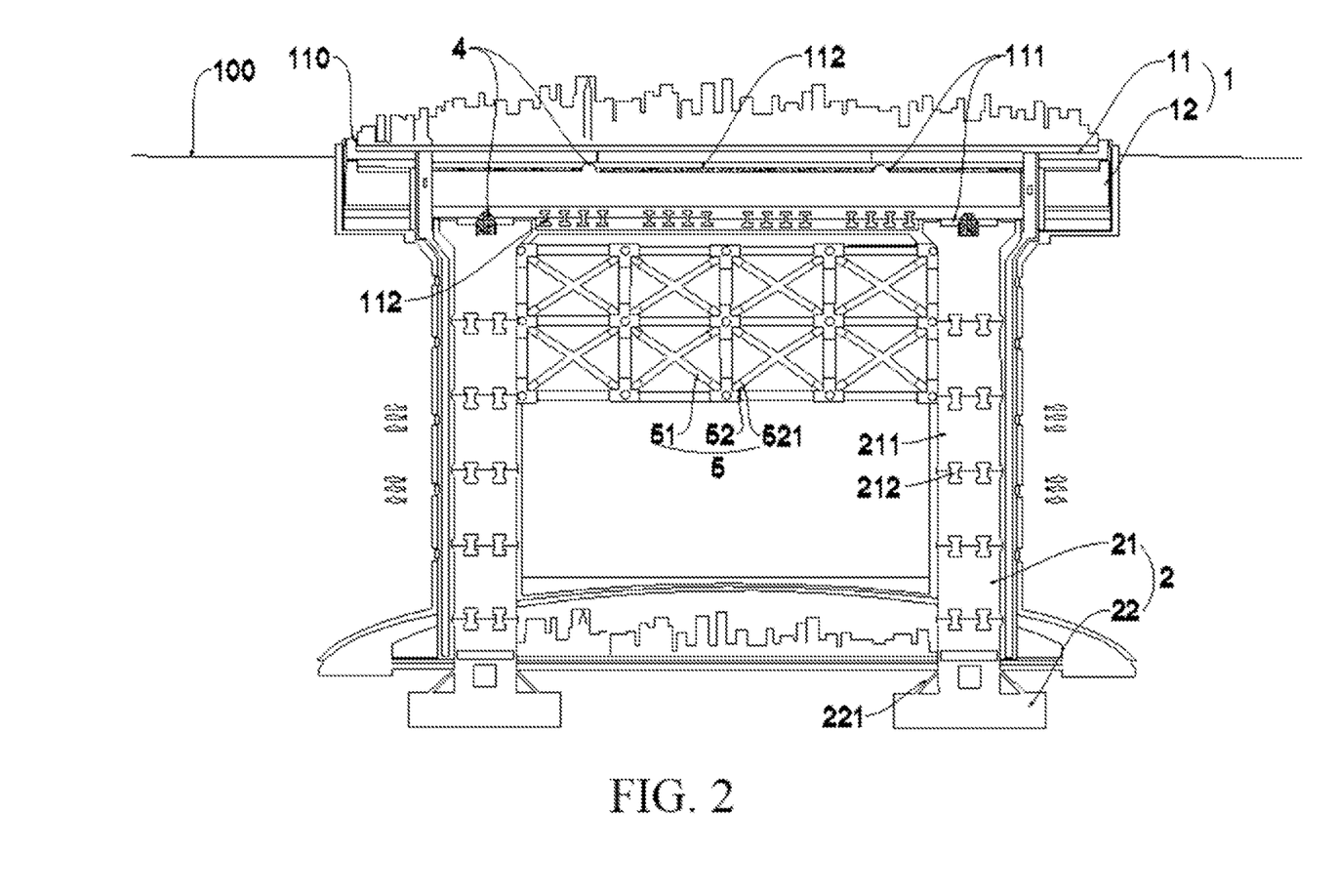
FIG. 2 is a schematic diagram of a cooperation structure of a supporting structure and an island body.

Preferably, the island main body 1 of the present embodiment is formed by splicing two layers of compartment bodies in a vertical direction. Referring to FIG. 1 and FIG. 2, the island main body 1 includes a first compartment body 11 and a second compartment body 12. The second compartment body 12 is located below the first compartment body 11; the lower parts of the first compartment body 11 and the second compartment body 12 are both provided with the above-mentioned mounting parts 111; the carrying part 4 exists at the upper part of the second compartment body 12; liquid is poured into the second compartment body 12 till the mounting part 111 on it is clamped with the carrying part 4 on the supporting structure 2; and liquid is poured into the compartment body 11 till the mounting part 111 on it is clamped with the carrying part 4 on the second compartment body 12, thus completing the splicing of the island main body 1. Moreover, the upper part of the first compartment body 11 can be located above the sea surface by 10 to 20 m to form a semi-submersible type offshore floating island.

The first compartment body 11 and the second compartment body 12 are spliced to form the structure of the island main body 1, which is convenient to assemble and disassemble and easy to hoist and move. Meanwhile, the first compartment body 11 and the second compartment 12 can also be formed by splicing a plurality of compartment bodies in a horizontal direction, and are detachably connected into a whole through a connection plate to further facilitate assembling and disassembling.

As an optional implementation mode, referring to FIG. 1 and FIG. 2, one of the carrying part 4 and the mounting part 111 is a protruding structure, and the other one is a clamping slot structure; the protruding structure and the clamping slot structure adapt to each other and are in lock type clamping. The filler is liquid; each compartment body is provided with a liquid injection port 110; and the bottom of each compartment body has a balance weight layer 112 to facilitate sinking of the compartment body.

In the present embodiment, the carrying part 4 is the protruding structure, and the mounting part 111 is the clamping slot structure; liquid such as water is poured into each compartment body till the gravity of the compartment body is greater than the floatage to cause the clamping slot structure and the protruding structure to be clamped to complete the splicing. Furthermore, in order to increase the gravity of the compartment body to facilitate its sinking and the structural stability, referring to FIG. 1 and FIG. 2, the bottom of the first compartment body 11 is provided with the balance weight layer 112. For the above-mentioned balance weight layer 112, some materials (such as corrosion-resistant steel plates and lead blocks that are filled) having a relatively large density are mainly used and directly arranged at the bottom ends of the first compartment body 11 and the second compartment body 12. In this way, the balance weight layer 112 is used to adjust a balance weight ratio, so that the gravity centers of the first compartment body 11 and the second compartment body 12 will move down to make the island main body 1 stabler and not easy to topple over, and the compartment bodies easily sink to a position where the mounting parts 111 and the carrying parts 4 are clamped.

Figure 3:
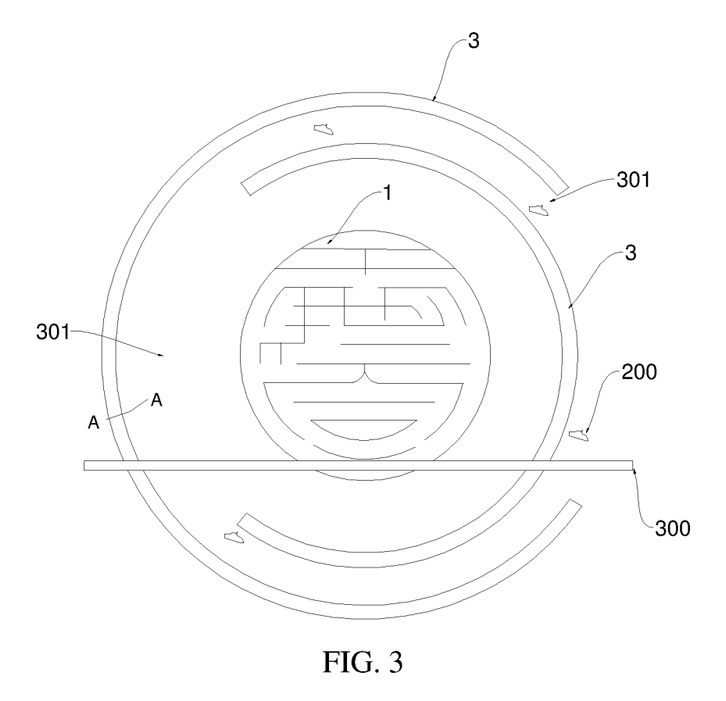
FIG. 3 is a top view of the first embodiment of the offshore floating island.
Figure 6:
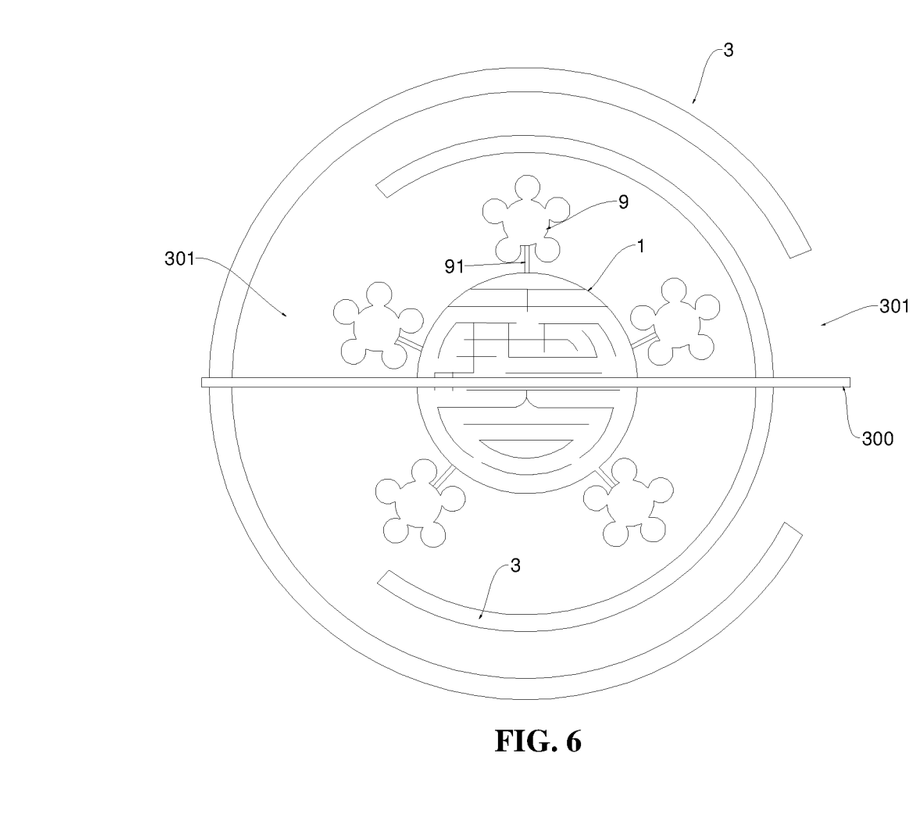
FIG. 6 is a top view of a second embodiment of an offshore floating island.

Considering a harsh marine environment, strong stormy waves and big sea waves, in order to make the structure of the offshore floating island stabler, invasion of stormy waves and sea waves is reduced. Referring to FIG. 1, FIG. 3, and FIG. 6, the offshore floating island of the present embodiment further includes a fender wall 3. The fender wall 3 is vertically disposed, with its bottom end fixed at the seabed through a fixing anchor rod 32; the bottom end of the fixing anchor rod 32 is provided with an anchor stake 33; and the anchor stake 33 is buried into the seabed. Preferably, the anchor stake 33 is embedded into a rock stratum of the seabed to guarantee the structural stability. By the arrangement of the fender wall 3, a certain protective effect can be achieved around the offshore floating island to reduce the invasion of the sea waves and the stormy waves to the offshore floating island and use the structural stability of the offshore floating island.

Figure 4:
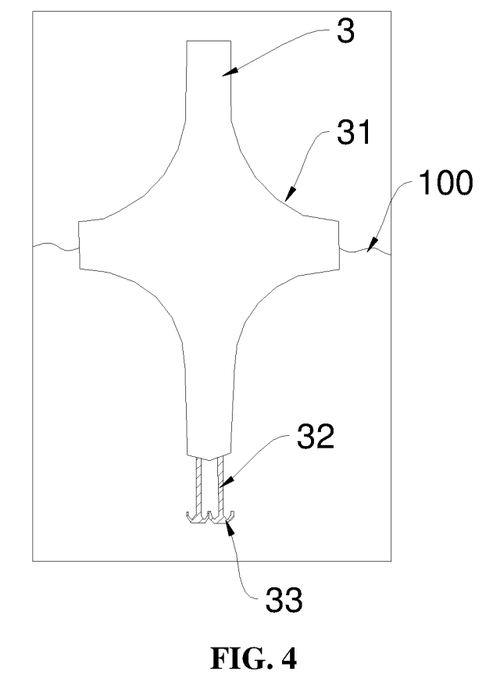
FIG. 4 is a schematic diagram of a sectional structure of a portion A-A in FIG. 3.

Preferably, referring to FIG. 1 and FIG. 4, a longitudinal section of the fender wall 3 is of a cross structure, wherein a part in the cross structure above a horizontal section is located on the sea surface 100; and the horizontal section and a vertical section are connected through an arc-shaped buffer plane 31.

Referring to FIG. 1, when stormy waves come, the stormy waves are weakened via the arc-shaped buffer plane 31 outside the fender wall 3. Under the buffer action of the arc-shaped buffer plane 31, the energy is greatly reduced, thereby reducing the impact on the offshore floating island. The arrangement of the arc-shaped buffer plane 31 also reduces the direct impact of the stormy waves on the fender wall 3.

In order to further protect the offshore floating island, as an optional implementation mode, referring to FIG. 1, FIG. 3, and FIG. 6, two or more layers of fender walls 3 are provided, and all the fender walls 3 surround the island main body 1. Each layer of fender wall 3 has an open part 301 to allow a ship 200 to get in and get out, and all the open parts 301 are disposed on different sides of the island main body 1; and adjacent fender walls 3 are disposed at intervals to form a travel passage.

On the one hand, cooperating structures of all the above-mentioned fender walls 3 can play a role of resisting the stormy waves on the offshore floating island at 360 degrees by means of cooperation, so that the protective effect is outstanding, and the structural stability of the offshore floating island is guaranteed; and on the other hand, by the use of the structural arrangement of the open parts 301 of two or more fender walls 3, the ship 200 can normally drive into and out of the offshore floating island by means of the travel passage to ensure a smooth traffic.

Embodiment 2

The supporting structure 2 is built at the seabed to play a role of supporting the island main body 1. Referring to FIG. 1 and FIG. 2, the present embodiment provides a specific implementation mode of one supporting structure 2. The supporting structure 2 includes a pier. The pier includes a mast main body 21 and a base 22; and the carrying part 4 is located at the upper part of the mast main body 21. The base 22 is connected to the bottom end of the mast main body 21 and buried into the seabed; the mast main body 21 includes a plurality of sections of upright columns 211 connected in sequence through connection piles 212; the base 22 is provided with pull rods 221; and the pull rods 221 are distributed on two sides of the mast main body 21 and are connected with the mast main body 21 and the base 22.

The base 22 is used to enlarge a bottom area of the mast main body 21, and the base 22 is buried into the seabed to achieve a fixing effect. The mast main body 21 is formed by connecting a plurality of vertically disposed upright columns 211 through the connection piles 212, so that it is convenient to assemble, disassemble, tow, and maintain while achieving a supporting effect.

In order to further improve the structural stability of the pier, as an optional implementation mode, referring to FIG. 2, two or more piers are provided. All the piers are arranged at intervals; a fixed assembly 5 for connecting adjacent piers exists between the adjacent piers; each fixed assembly 5 includes rod bodies 51 and connection pieces 52, wherein the rod bodies 51 are horizontally disposed and/or vertically disposed and/or staggered; and the connection pieces 52 are provided with a plurality of sleeve bodies 521 for inserting and fixing the rod bodies 51 to connect the plurality of adjacent rod bodies 51.

As shown in FIG. 2, the fixed assembly 5 is arranged at the upper part of the mast main body 21; the two opposite sides of the mast main body 21 are fixed with the above-mentioned connection pieces 52; the above-mentioned horizontally disposed, vertically disposed and staggered rod bodies 51 exist between adjacent mast main bodies 21; and two ends of the rod bodies 51 are inserted into the sleeve bodies 521 of the connection pieces 52 to realize mutual lock connection. By means of the rod bodies 51 and the connection pieces 52 of the structure, all the piers can be connected and locked, thereby facilitating removal and installation on the basis of improving the structural stability of the pier structure.

Embodiment 3

Figure 5:
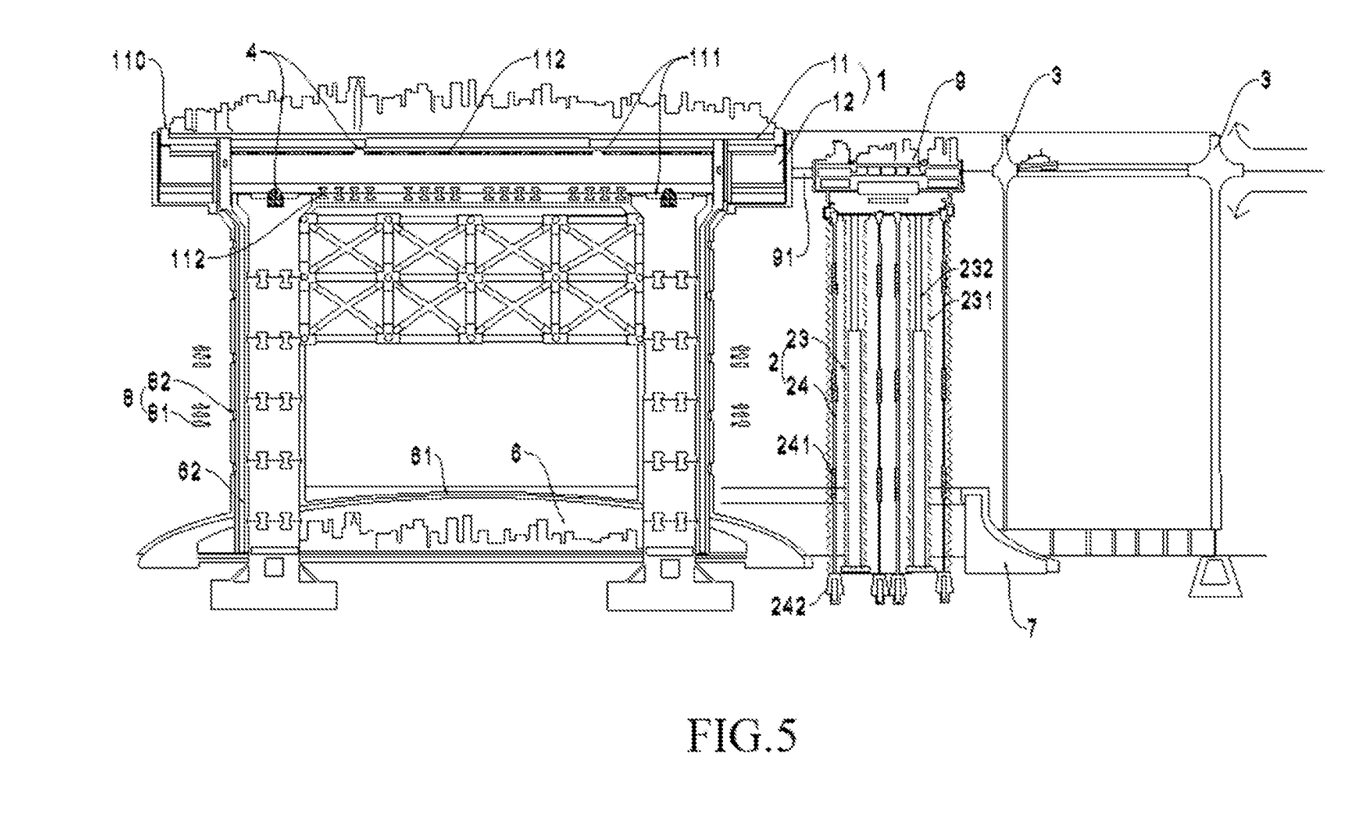
FIG. 5 is a schematic structural diagram of the second embodiment of the offshore floating island.

The present embodiment provides a specific implementation mode of another supporting structure 2. Referring to FIG. 5, the present embodiment is different from the supporting structure 2 of Embodiment 2. In the present embodiment, the supporting structure 2 includes an anchor rod 24 and a hydraulic mechanism 23, wherein the upper ends of the anchor rod and the hydraulic mechanism are both connected with the compartment bodies, and the lower ends of the anchor rod and the hydraulic mechanism are both fixed at the seabed; the hydraulic mechanism 23 includes a shell 231 and a hydraulic telescopic rod 232; the hydraulic telescopic rod 232 is located in the shell 231; and the shell 231 is of a corrugated structure and can telescopically deform under the action of an external force to adapt to extension and retraction of the hydraulic mechanism 23.

The shell 231 achieves an effect of protecting the hydraulic telescopic rod 232 inside to prevent seawater from impacting the hydraulic telescopic rod 232 and damaging it, and the telescopic end of the hydraulic telescopic rod abuts against the bottom of the compartment body to push the compartment body, wherein the lower end of the anchor rod 24 is connected with a fixed seat 242; the fixed seat 242 is buried into the seabed; and the bottom end of the shell 231 in the hydraulic mechanism 23 is buried into the seabed to achieve a fixing effect.

The anchor rod 24 is used to pull down the compartment bodies; and the anchor rod 24 is provided with a buffer piece 241 that telescopically deforms under the action of the external force. The upper ends of the anchor rod 24 and the hydraulic mechanism 23 are both fixedly connected with a supporting plate or a supporting block; the hearing part 4 exists at the upper end of the supporting plate or the supporting block; and the first compartment body 11 and the second compartment body 12 are also fixed with the supporting structure 2 in a clamped manner.

The above-mentioned hydraulic mechanism 23 is existing hydraulic equipment. For example, the hydraulic telescopic rod 232 is driven by means of a hydraulic pump, and details are omitted here. In the present embodiment, the hydraulic telescopic rod 232 abuts against the second compartment body 12 to adjust a pressure fluctuation of a road instantaneously caused by a load or sea waves and keep the balance of the island main body 1. Meanwhile, the anchor rod 24 pulls down the island main body 1. The island main body 1 simultaneously undergoes a down tensile force of the anchor rod 24 and an up pushing force of the hydraulic telescopic rod 232, so that the island main body 1 is in a stable state and not susceptible to the movement of the seawater, and the structure of the island main body 1 is stabler.

Moreover, the buffer piece 241 connected to the anchor rod 24 can be a spring buffer, so that the anchor rod 24 can have a certain movement space for resetting. Meanwhile, the spring buffer has a relatively large elastic coefficient. Generally, the spring buffer cannot be randomly stretched or compressed. The spring buffer will be stretched or compressed only when it undergoes a relatively high acting force, such as great hydraulic expansion and extension, upward extension and retraction, or large sea wave action.

Figure 7:
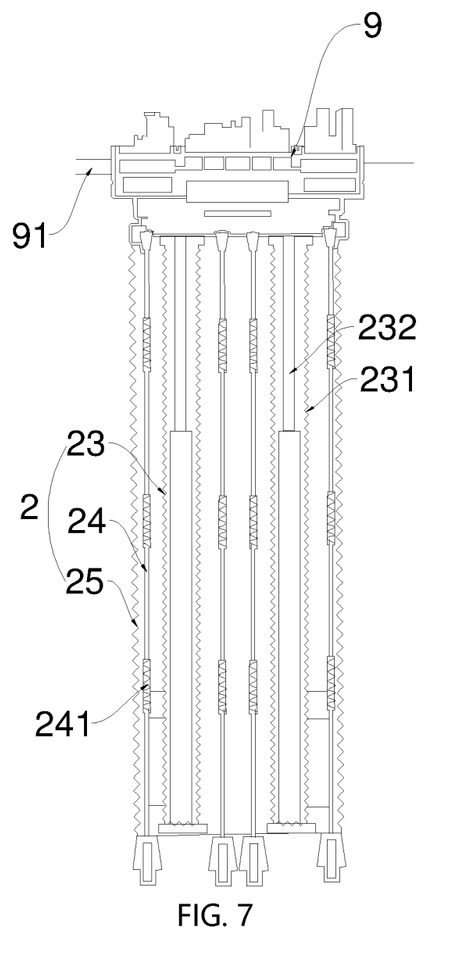
FIG. 7 is a schematic structural diagram of an edge island.

Preferably, referring to FIG. 5 and FIG. 7, the supporting structure 2 in the present embodiment further includes a protective housing 25. The upper end of the protective housing 25 is connected and fixed with the bottom of an edge island, and the bottom end of the protective housing is connected and fixed with the seabed or the fixed seat 242 to cover the anchor rod 24 and the hydraulic mechanism 23 inside and prevent the seawater from damaging the anchor rod 24 and the hydraulic mechanism 23. The protective housing 25 is a hood body of a corrugated structure and can telescopically deform under the action of the external force, so as to adapt to the deformation of the buffer piece 241 and the extension and retraction of the hydraulic mechanism 23.

Embodiment 4

In order to further use the space, on the basis of the above-mentioned embodiments, referring to FIG. 1 and FIG. 5, a submarine foundation 6 is also arranged below the island body 1. The submarine foundation 6 includes an outer shell 61 and a ventilation pipeline 62; an independent foundation space is constructed in the outer shell 61; the ventilation pipeline 62 is located in the supporting structure 2; the bottom end of the ventilation pipeline 62 communicates with the foundation space, and the upper end of the ventilation pipeline extends to a position above the sea surface 100. When the bottom area of the island main body 1 is relatively large, the above-mentioned submarine foundation 6 can be considered. Furthermore, when the supporting structure 2 is of the pier structure of the above-mentioned embodiment, it is suitable for constructing the above-mentioned submarine foundation 6. When the supporting structure 2 is of the structure formed by the anchor rod 24 and the hydraulic mechanism 23, the above-mentioned submarine foundation 6 may not be set.

The outer shell 61 of the arc-shaped structure encloses an independent and sealed foundation space. Architectures such as a steel bar structure can be constructed in the foundation space, so that the space below the offshore floating island is fully used. Furthermore, the ventilation pipeline 62 is built in the pier structure to provide sufficient air into the submarine foundation 6.

In order to guarantee the structural stability of the submarine foundation 6, referring to FIG. 1 and FIG. 5, a seabed fender wall 7 exists at a periphery of the submarine foundation 6; the seabed fender wall 7 is fixed at the seabed, and has a vertical height not less than that of the submarine foundation 6; and at least one side surface of the seabed fender wall 7 facing away from the submarine foundation 6 is an arc-shaped surface 71 to buffer the impact of seawater.

The above-mentioned seabed fender wall 7 is constructed at the seabed, can be of a circular structure or a fan-shaped structure, and encircles or semi-encircles the submarine foundation 6. The arc-shaped surface 71 on the seabed fender wall 7 can buffer the impact of the seawater to ensure the structural stability of the submarine foundation 6. One or two or more layers of the above-mentioned seabed fender walls 7 can be arranged at the periphery of the submarine foundation 6.

Embodiment 5

On the basis of above-mentioned Embodiment 4, in order to facilitate people getting into and getting out of the submarine foundation 6 successfully, as an optional implementation mode, an elevator access exists in the supporting structure 2, such as in the pier, of the present embodiment, and the elevator access is connected with the island main body 1 and the submarine foundation 6. People can go to and leave cities in the sea by an elevator. n case of an emergency, such as an elevator failure, in order to ensure the safety, the offshore floating island of the present embodiment further includes an escape system 8. The escape system 8 includes a safety cabin 82 and an escape cabin 81; the safety cabin 82 is arranged on the supporting structure 2, and an emergency escape exit is arranged on the safety cabin; the escape cabin 81 is located in the safety cabin 82; and the escape cabin 81 is equipped with a propeller propulsion mechanism.

The above-mentioned escape cabin 81 can be completely closed and has an oxygen supply system. Since it is equipped with the propeller propulsion mechanism and wings, the escape cabin can carry escape personnel to steadily float to the sea surface 100. The above-mentioned escape cabin 81 can use an existing device in the market, and an oxygen system and the propeller propulsion mechanism are also readily available in the field of marine traffic, so that details of the structure are omitted. Those skilled in the art can set a large-size or small-size escape cabin according to an actual situation.

The above-mentioned safety cabin 82 is used to protect the escape cabin 81 from being corroded to realize safe and stable normal operation. The safety cabin 82 can be made of a corrosion-resistant and high-intensity material itself to prevent corrosion by the seawater and destruction by marine organisms. The safety cabin 82 can be equipped with an openable door. In case of emergency, people can be evacuated to two sides of the submarine foundation 6 to the safety cabin 82, open the openable door to get into the safety cabin 82, open a door body of the escape cabin 81 to get into the escape cabin 81, and then close the openable door. The escape cabin 81 enters water under the floatage of the water and the power of the propeller propulsion mechanism and gradually floats to the surface for escaping. The above-mentioned openable door can use an existing automatic door.

Embodiment 6

In order to enlarge the space of the offshore floating island, on the basis of the above-mentioned embodiment, referring to FIG. 5 and FIG. 6, the island main body 1 is also connected with edge islands 9, wherein all the edge islands 9 are distributed around the island main body 1, and are connected to the island main body through bridges 91; and the structure of each edge island 9 is the same as the island main body 1. The offshore floating island is also connected with a submarine tunnel 300 and/or an offshore tunnel 300.

There can be one or two or more edge islands 9. The edge islands 9 are also arranged in the fender walls 3. The structure of each edge island 9 is the same as the structure of the island main body 1, so that the edge islands all cooperate with each other for fixing by means of the above-mentioned compartment bodies and supporting structures 2. It is suitable for the supporting structures 2 of the edge islands 9 to use the anchor rod 24 and the hydraulic mechanism 23 of Embodiment 3.

Going to and leaving the offshore floating island can be realized by means of the ship 200 or the submarine tunnel 300 or the offshore tunnel 300 to ensure the traffic of the offshore floating island.

In the offshore floating island in the specific implementation modes of the present disclosure, detachable buildings can be set on the floating island; by means of the fender walls 3 and the supporting structures 2, the island main body 1 and the edge islands 9 can stand the stormy waves in the sea to keep relatively steady; and the design of the buildings on the offshore floating island should be fully based on uniform weight, reasonable distribution and no biasing. Clamping between the pourable compartment bodies and the supporting structures 2 is convenient for assembling and disassembling. The compartment bodies can be towed by a towboat and the like for assembling and disassembling according to a specific plan. In order to fully use the energy in the sea, seawater power generation equipment, wind power generation equipment, small-size nuclear electric power generation equipment, solar energy power generation equipment, etc. can also be set on the island main body 1.

According to the descriptions of the present specification, specific features, structures, or characteristic may be combined in any one or more embodiments or examples in an appropriate manner.

In the description of the present specification, descriptions of the reference terms such as "one embodiment", "some embodiments", "examples", "specific examples," or "some examples" mean that specific features, structures, materials or characteristics described in combination with the embodiments or examples are included in at least one embodiment or example of the present utility model. In the present specification, the schematic representations of the above terms do not necessarily refer to the same embodiment or example. Moreover, the described specific features, structures, materials or characteristics may be combined in any one or more embodiments or examples in an appropriate manner. In addition, those skilled in the art can connect and combine the different embodiments or examples and the features of the different embodiments or examples described in the present specification without contradicting each other.

The above descriptions are only specific implementation modes of the present disclosure, but the protection scope of the present disclosure is not limited to this. Any person skilled in the art can easily think of changes or replacements within the technical scope disclosed by the present disclosure. The changes or replacements should be covered by the protection scope of the present disclosure. Therefore, the protection scope of the present disclosure should be subject to the protection scope of the claims.

What is claimed is:

1. An offshore floating island, comprising a supporting structure and an island main body, wherein the bottom of the supporting structure is fixed at the seabed, and the island main body comprises one or two or more compartment bodies;

the upper part of the supporting structure is provided with a carrying part; the bottom of each compartment body is provided with a mounting part; the compartment body is of a cavity structure, and a filler is injected to the compartment body till the compartment body sinks to cause the mounting part to be in lock type clamping with the carrying part, so that the compartment body and the supporting structure are detachably connected; and each compartment body is at least partially higher than the sea surface after the compartment body and the supporting structure are assembled in place;

wherein the supporting structure comprises an anchor rod and a hydraulic mechanism, wherein the upper ends of the anchor rod and the hydraulic mechanism are connected with the compartment bodies, and the lower ends of the anchor rod and the hydraulic mechanism are fixed at the seabed;

the hydraulic mechanism comprises a shell and a hydraulic telescopic rod; the hydraulic telescopic rod is located in the shell, and a telescopic end of the hydraulic telescopic rod abuts against the bottoms of the compartment bodies to push the compartment bodies; the anchor rod is used to pull down the compartment bodies; and the anchor rod is provided with a buffer piece that telescopically deforms under the action of an external force;

the supporting structure further comprises a protective housing; the protective housing covers the anchor rod and the hydraulic mechanism inside; the protective housing is a hood body of a corrugated structure and can telescopically deform under the action of the external force;

wherein a submarine foundation is also arranged below the island main body; the submarine foundation comprises an outer shell and a ventilation pipeline; an independent foundation space is constructed in the outer shell; the ventilation pipeline is located in the supporting structure; the bottom end of the ventilation pipeline communicates with the foundation space, and the upper end of the ventilation pipeline extends to a position above the sea surface;

a seabed fender wall exists at a periphery of the submarine foundation; the seabed fender wall is fixed at the seabed, and has a vertical height not less than that of the submarine foundation; and at least one side surface of the seabed fender wall facing away from the submarine foundation is an arc-shaped surface to buffer impact of seawater.

2. The offshore floating island according to claim 1, wherein one of the carrying part and the mounting part is a protruding structure, and the other one is a clamping slot structure; the protruding structure and the clamping slot structure adapt to each other and are in lock type clamping;

the filler is liquid; each compartment body is provided with a liquid injection port; and the bottom of each compartment body has a balance weight layer to facilitate sinking of the compartment body.

3. The offshore floating island according to claim 1, wherein the offshore floating island further comprises a fender wall; the fender wall is vertically disposed, with the bottom end fixed at the seabed through a fixing anchor rod; a longitudinal section of the fender wall is of a cross structure, wherein a part in the cross structure above a horizontal section is located on the sea surface; and the horizontal section and a vertical section are connected through an arc-shaped buffer plane.

4. The offshore floating island according to claim 3, wherein two or more layers of fender walls are provided, and all the fender walls surround the island main body; each layer of fender wall has an open part to allow a ship to get in and get out, and all the open parts are disposed on different sides of the island main body; and adjacent fender walls are disposed at intervals to form a travel passage.

5. The offshore floating island according to claim 1, wherein the supporting structure comprises a pier; the pier comprises a mast main body and a base; the carrying part is located at the upper part of the mast main body, wherein
    the base is connected to the bottom end of the mast main body and buried into the seabed; the mast main body comprises a plurality of sections of upright columns connected in sequence through connection piles; the base is provided with pull rods; and the pull rods are distributed on two sides of the mast main body and are connected with the mast main body and the base.

6. The offshore floating island according to claim 5, wherein two or more piers are provided; a fixed assembly for connecting adjacent piers exists between the adjacent piers; each fixed assembly comprises rod bodies and connection pieces, wherein
    the rod bodies are horizontally disposed and/or vertically disposed and/or staggered; and the connection pieces are provided with a plurality of sleeve bodies for inserting and fixing the rod bodies to connect the plurality of adjacent rod bodies.

7. The offshore floating island according to claim 1, wherein an elevator access exists in the supporting structure, and the elevator access is connected with the island main body and the submarine foundation;
    the offshore floating island further comprises an escape system; the escape system comprises a safety cabin and an escape cabin; the safety cabin is arranged on the supporting structure, and an emergency escape exit is arranged on the safety cabin; the escape cabin is located in the safety cabin; and the escape cabin is equipped with a propeller propulsion mechanism.

8. The offshore floating island according to claim 1, wherein the island main body is also connected with edge islands, wherein all the edge islands are distributed around the island main body, and are connected to the island main body through bridges; the structure of each edge island is the same as the island main body;
    the offshore floating island is also connected with a submarine tunnel and/or an offshore tunnel.

\* \* \* \* \*